(12) United States Patent
Ferris (10) Patent No.: US 7,886,038 B2
(45) Date of Patent: Feb. 8, 2011

(54) METHODS AND SYSTEMS FOR USER IDENTITY MANAGEMENT IN CLOUD-BASED NETWORKS

(75) Inventor: James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 118 days.

(21) Appl. No.: 12/127,102

(22) Filed: May 27, 2008

(65) Prior Publication Data

US 2009/0300152 A1    Dec. 3, 2009

(51) Int. Cl.
G06F 15/173 (2006.01)

(52) U.S. Cl. ................................ 709/223

(58) Field of Classification Search ........ 709/223–235; 726/26–28
See application file for complete search history.

(56) References Cited

U.S. PATENT DOCUMENTS

| | | | |
|---|---|---|---|
| 7,439,937 B2 | 10/2008 | Ben-Shachar et al. | |
| 7,546,462 B2 | 6/2009 | Upton | |
| 2002/0165819 A1 | 11/2002 | McKnight et al. | |
| 2004/0162902 A1 | 8/2004 | Davis | |
| 2004/0210591 A1* | 10/2004 | Hirschfeld et al. | 707/100 |
| 2004/0210627 A1 | 10/2004 | Kroening | |
| 2004/0268347 A1 | 12/2004 | Knauerhase et al. | |
| 2005/0144060 A1 | 6/2005 | Chen et al. | |
| 2005/0182727 A1 | 8/2005 | Robert et al. | |
| 2006/0075042 A1 | 4/2006 | Wang et al. | |
| 2006/0085530 A1 | 4/2006 | Garrett | |
| 2006/0130144 A1 | 6/2006 | Wernicke | |
| 2006/0224436 A1 | 10/2006 | Matsumoto et al. | |
| 2007/0011291 A1 | 1/2007 | Mi et al. | |
| 2007/0226715 A1 | 9/2007 | Kimura et al. | |
| 2007/0283282 A1 | 12/2007 | Bonfiglio et al. | |
| 2007/0294676 A1 | 12/2007 | Mellor et al. | |
| 2008/0082601 A1* | 4/2008 | Meijer et al. | 709/203 |
| 2008/0083025 A1* | 4/2008 | Meijer et al. | 726/9 |
| 2008/0083040 A1* | 4/2008 | Dani et al. | 726/28 |
| 2008/0086727 A1 | 4/2008 | Lam et al. | |
| 2008/0091613 A1 | 4/2008 | Gates et al. | |
| 2008/0215796 A1 | 9/2008 | Lam et al. | |
| 2008/0240150 A1 | 10/2008 | Dias et al. | |
| 2009/0025006 A1 | 1/2009 | Waldspurger | |

(Continued)

OTHER PUBLICATIONS

"rBuilder and the rPath Appliance Platform", 2007 rPath, Inc., www.rpath.com, 3 pages.

(Continued)

*Primary Examiner*—Krisna Lim
(74) *Attorney, Agent, or Firm*—MH2 Technology Law Group LLP (57) ABSTRACT

An identity management system can reside within the cloud computing environment. The identity management system can be linked to systems, such as virtual machines, applications, and/or appliances, both inside and outside the cloud computing environment to provide identity management to those systems. In order to provide identity management, the identity management system can be configured to link to the systems in order to receive, store, maintain, and provide identity information. The information can identify items (users, devices, products, services) associated with the systems. The identity management system can be configured to store and maintain the information in records. The identity management system can also be configured to charge owners and operators of the systems for the identity management.

24 Claims, 5 Drawing Sheets

U.S. PATENT DOCUMENTS

| | | | |
|---|---|---|---|
| 2009/0037496 A1 | 2/2009 | Chong et al. | |
| 2009/0089078 A1 | 4/2009 | Bursey | |
| 2009/0099940 A1 | 4/2009 | Frederick et al. | |
| 2009/0177514 A1 | 7/2009 | Hudis et al. | |
| 2009/0210527 A1 | 8/2009 | Kawato | |
| 2009/0210875 A1 | 8/2009 | Bolles et al. | |
| 2009/0222805 A1 | 9/2009 | Faus et al. | |
| 2009/0228950 A1* | 9/2009 | Reed et al. ..................... | 726/1 |
| 2009/0248693 A1 | 10/2009 | Sagar et al. | |
| 2009/0249287 A1 | 10/2009 | Patrick | |
| 2009/0265707 A1 | 10/2009 | Goodman et al. | |
| 2009/0276771 A1 | 11/2009 | Nickolov et al. | |
| 2009/0287691 A1 | 11/2009 | Sundaresan et al. | |
| 2009/0293056 A1 | 11/2009 | Ferris | |
| 2009/0299905 A1 | 12/2009 | Mestha et al. | |
| 2009/0299920 A1 | 12/2009 | Ferris et al. | |
| 2009/0300057 A1 | 12/2009 | Friedman | |
| 2009/0300149 A1 | 12/2009 | Ferris et al. | |
| 2009/0300151 A1 | 12/2009 | Friedman et al. | |
| 2009/0300169 A1 | 12/2009 | Sagar et al. | |
| 2009/0300210 A1 | 12/2009 | Ferris | |
| 2009/0300423 A1 | 12/2009 | Ferris | |
| 2009/0300607 A1 | 12/2009 | Ferris et al. | |
| 2009/0300608 A1 | 12/2009 | Ferris | |
| 2009/0300635 A1 | 12/2009 | Ferris | |
| 2009/0300719 A1 | 12/2009 | Ferris | |
| 2010/0042720 A1 | 2/2010 | Stienhans et al. | |
| 2010/0050172 A1 | 2/2010 | Ferris | |
| 2010/0057831 A1 | 3/2010 | Williamson | |
| 2010/0058347 A1 | 3/2010 | Smith et al. | |
| 2010/0131324 A1 | 5/2010 | Ferris | |
| 2010/0131624 A1 | 5/2010 | Ferris | |
| 2010/0131649 A1 | 5/2010 | Ferris | |
| 2010/0131948 A1 | 5/2010 | Ferris | |
| 2010/0131949 A1 | 5/2010 | Ferris | |
| 2010/0132016 A1 | 5/2010 | Ferris | |

OTHER PUBLICATIONS

White Paper—"rPath Versus Other Software Appliance Approaches", Mar. 2008, rPath, Inc., www.rpath.com, 9 pages.
White Paper—"Best Practices for Building Virtual Appliances", 2008 rPath, Inc., www.rpath.com, 6 pages.
Ferris, "Methods and Systems for Providing a Market for User-Controlled Resources to be Provided to a Cloud Computing Environment", U.S. Appl. No. 12/390,617, filed Feb. 23, 2009.
Ferris, "Methods and Systems for Communicating with Third Party Resources in a Cloud Computing Environment", U.S. Appl. No. 12/390,598, filed Feb. 23, 2009.
Ferris, "Systems and Methods for Extending Security Platforms to Cloud-Based Networks", U.S. Appl. No. 12/391,802, filed Feb. 24, 2009.
DeHaan et al., "Methods and Systems for Flexible Cloud Management", U.S. Appl. No. 12/473,041, filed May 27, 2009.
Ferris, "Methods and Systems for Providing a Universal Marketplace for Resources for Delivery to a Cloud Computing Environment", U.S. Appl. No. 12/475,228, filed May 29, 2009.
DeHaan et al., "Systems and Methods for Power Management in Managed Network Having Hardware-Based and Virtual Reources", U.S. Appl. No. 12/475,448, filed May 29, 2009.
DeHaan et al., "Methods and Systems for Flexible Cloud Management with Power Management Support", U.S. Appl. No. 12/473,987, filed May 28, 2009.
DeHaan, "Methods and Systems for Automated Scaling of Cloud Computing Systems", U.S. Appl. No. 12/474,707, filed May 29, 2009.
DeHaan, "Methods and Systems for Securely Terminating Processes in a Cloud Computing Environment", U.S. Appl. No. 12/550,157, filed Aug. 28, 2009.
DeHaan, "Methods and Systems for Flexible Cloud Management Including External Clouds", U.S. Appl. No. 12/551,506, filed Aug. 31, 2009.
DeHaan, "Methods and Systems for Abstracting Cloud Management to Allow Communication Between Independently Controlled Clouds", U.S. Appl. No. 12/551,096, filed Aug. 31, 2009.
DeHaan, "Methods and Systems for Automated Migration of Cloud Processes to External Clouds", U.S. Appl. No. 12/551,459, filed Aug. 31, 2009.
Ferris, "Methods and Systems for Pricing Software Infrastructure for a Cloud Computing Environment", U.S. Appl. No. 12/551,517, filed Aug. 31, 2009.
Ferris et al., "Methods and Systems for Metering Software Infrastructure in a Cloud Computing Environment", U.S. Appl. No. 12/551,514, filed Aug. 31, 2009.
DeHaan et al., "Systems and Methods for Secure Distributed Storage", U.S. Appl. No. 12/610,081, filed Oct. 30, 2009.
Ferris et al., "Methods and Systems for Monitoring Cloud Computing Environment", U.S. Appl. No. 12/627,764, filed Nov. 30, 2009.
Ferris et al., "Methods and Systems for Detecting Events in Cloud Computing Environments and Performing Actions Upon Occurrence of the Events", U.S. Appl. No. 12/627,646, filed Nov. 30, 2009.
Ferris et al., "Methods and Systems for Verifying Software License Compliance in Cloud Computing Environments", U.S. Appl. No. 12/627,643, filed Nov. 30, 2009.
Ferris et al., "Systems and Methods for Service Aggregation Using Graduated Service Levels in a Cloud Network", U.S. Appl. No. 12/628,112, filed Nov. 30, 2009.
Ferris et al., "Methods and Systems for Generating a Software License Knowledge Base for Verifying Software License Compliance in Cloud Computing Environments", U.S. Appl. No. 12/628,156, filed Nov. 30, 2009.
Ferris at al., "Methods and Systems for Converting Standard Software Licenses for Use in Cloud Computing Environments", U.S. Appl. No. 12/714,099, filed Feb. 26, 2010.
Ferris et al., "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12/714,427, filed Feb. 26, 2010.
Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris at al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.

Ferris et al., "Systems and Methods for Exporting Usage History Data as Input to a Management Platform of a Target Cloud-Based Network", U.S. Appl. No. 12/790,415, filed May 28, 2010.

Ferris et al., "Systems and Methods for Cross-Vendor Mapping Service in Cloud Networks", U.S. Appl. No. 12/790,162, filed May 28, 2010.

Ferris et al., "Systems and Methods for Cross-Cloud Vendor Mapping Service in a Dynamic Cloud Marketplace", U.S. Appl. No. 12/790,229, filed May 28, 2010.

Ferris et al., "Systems and Methods for Aggregate Monitoring of Utilization Data for Vendor Products in Cloud Networks", U.S. Appl. No. 12/790,039, filed May 28, 2010.

DeHaan, "Methods and Systems for Abstracting Cloud Management", U.S. Appl. No. 12/474,113, filed May 28, 2009.

Ferris, et al., "Systems and Methods for Cominatorial Optimization of Multiple Resources Across a Set of Cloud-Based Networks", U.S. Appl. No. 12/953,718, filed Nov. 24, 2010.

Ferris et al., "Systems and Methods for Matching a Usage History to a New Cloud", U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "Systems and Methods for Migrating Subscribed Services in a Cloud Deployment", U.S. Appl. No. 12/955,277, filed Nov. 29, 2010.

Ferris et al., "Systems and Methods for Migrating Subscribed Services from a Set of Clouds to a Second Set of Clouds", U.S. Appl. No. 12/957,281, filed Nov. 30, 2010.

Morgan, "Systems and Methods for Generating Multi-Cloud Incremental Billing Capture and Administration", U.S. Appl. No. 12/954,323, filed Nov. 24, 2010.

Morgan, "Systems and Methods for Aggregating Marginal Subscription Offsets in a Set of Multiple Host Clouds", U.S. Appl. No. 12/954,400, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 24, 2010.

Ferris et al., "Systems and Methods for Migrating Software Modules into One or More Clouds", U.S. Appl. No. 12/952,701, filed Nov. 23, 2010.

Ferris et al., "Systems and Methods for Brokering Optimized Resource Supply Costs in Host Cloud-Based Network Using Predictive Workloads", U.S. Appl. No. 12/957,274, filed Nov. 30, 2010.

Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.

\* cited by examiner

METHODS AND SYSTEMS FOR USER IDENTITY MANAGEMENT IN CLOUD-BASED NETWORKS

FIELD

This invention relates generally to products and services, more particularly, to systems and methods for cloud computing related services and products.

DESCRIPTION OF THE RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application.

Whether in on-premise or in a cloud, virtual machines, applications, and appliances require identity management services. Identity management typically involves the management of information that identifies items (users, devices, products, services) associated with systems such as the virtual machines, applications, or appliances. This identity management may involve management of such information such as a user's identity for access to the system (e.g. login access, security), a user's identity or data maintained and provided by the system (e.g., directory services), a user's identity utilized by the system in processing (e.g. tracking, billing), and data or devices associated with the system. Typically, the owner or operator of the systems must purchase, install, and maintain the necessary infrastructure such as hardware and software to support the identity management services. Thus, there is a need in the art for methods and system that provides identity management services without the need for owners or operators to purchase and maintain the infrastructure for the identity management services.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information and service portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present teachings relate to systems and methods for providing identity management services in a cloud computing environment. More particularly, embodiments relate to platforms and techniques in which a identity management system can be configured to provide identity management services from within the cloud computing environment.

According to embodiments, in general, an identity management system can reside within the cloud computing environment. The identity management system can be linked to systems, such as virtual machines, applications, and/or appliances, both inside and outside the cloud computing environment to provide identity management to those systems. In order to provide identity management, the identity management system can be configured to link to the systems in order to receive, store, maintain, and provide identity information. The information can identify items (users, devices, products, services) associated with the systems. The identity management system can be configured to store and maintain the information in records. The identity management system can also be configured to charge the owners for the identity management.

By providing identity management from within the cloud, an owner or operator can receive identity management for their systems on-demand without the cost of purchasing and maintaining an identity management system.

Figure 1:
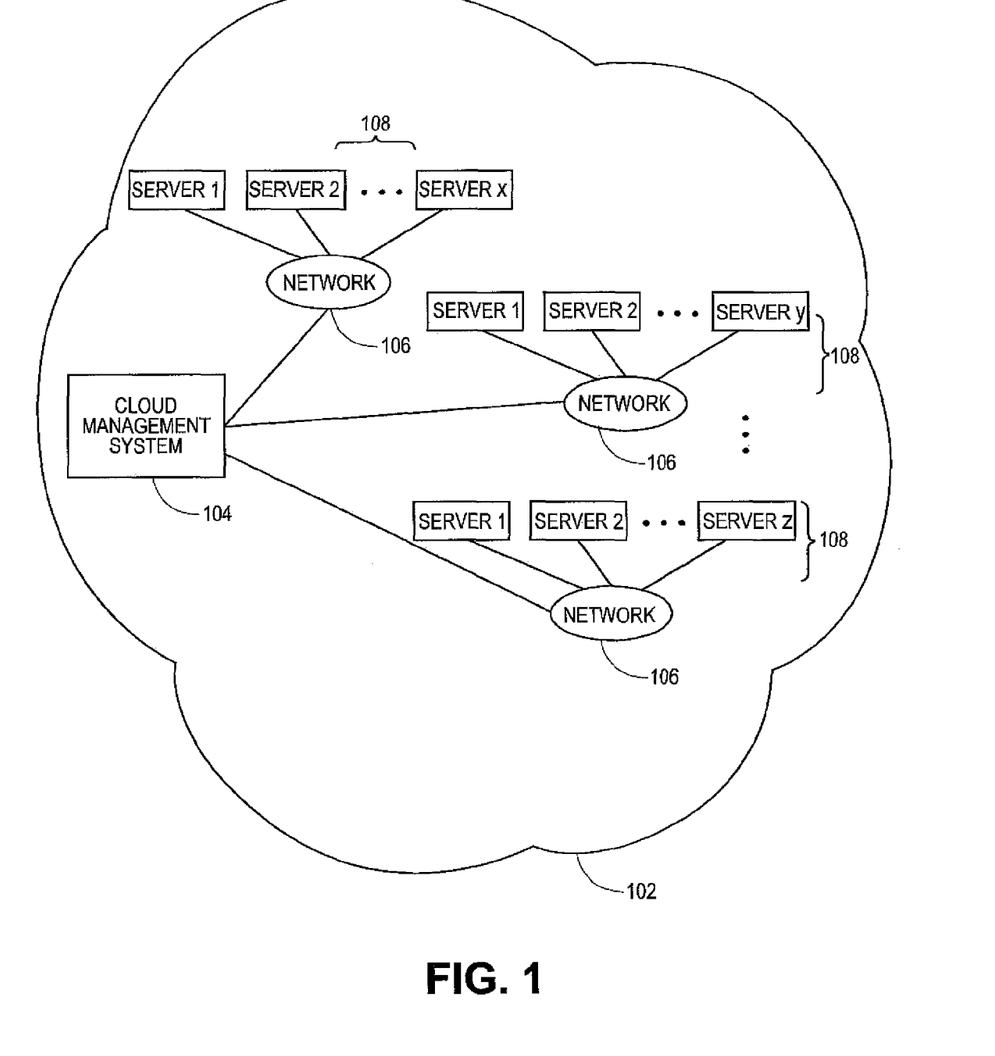
FIG. 1 illustrates an overall cloud system architecture in which various embodiments of the present teachings can be practiced.

FIG. 1 illustrates an overall cloud computing environment, in systems and methods for the management of subscriptions of cloud-based virtual machines can operate, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example one set of resource servers 108 may respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 may respond to a request for instantiation at a programmed time with an offer to deliver the specified quantity of processor cycles within a specific amount of time, such as the next 12 hours.

The cloud management system 104 can select group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet protocol (IP) addresses or other addresses. The cloud management system 104 can register the finalized group of servers in the set resource servers 108 contributing to an instantiated machine or process.

The cloud management system 104 can ten set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in set of resource servers 108 indicating a status regarding the provisioning of their respective resources. Various sets of resource servers may confirm, for example, the availability of a dedicated amount of processor cycles, amounts of electronic memory, communications bandwidth, or applications or other software prepared to be served.

Figure 2:
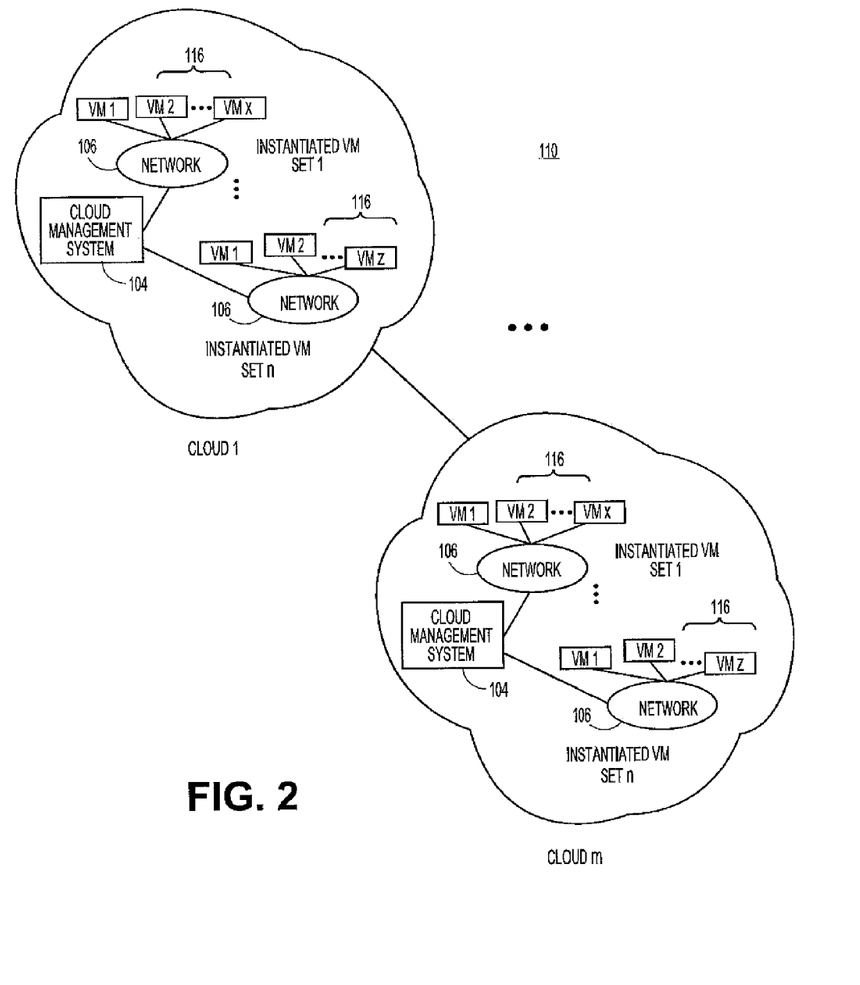
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other numbers of virtual machines to be made available to users on a network 114, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud can 102, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or delivery a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
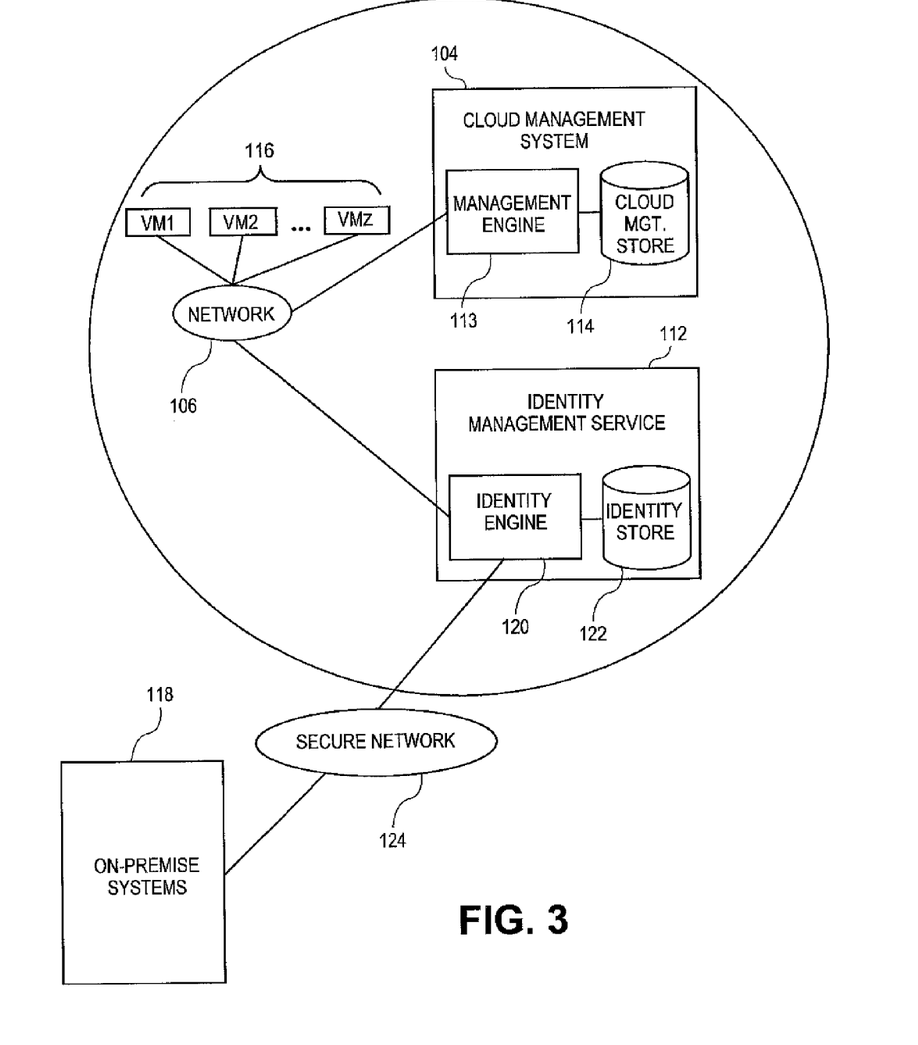
FIG. 3 illustrates a network configuration in which a cloud-based identity management service can provide for identity management, according to various embodiments.

FIG. 3 illustrates aspects of a identity management service 112 residing in the cloud 102, according to various embodiments. As shown, the cloud 102 can include the cloud management system 104. The cloud management system 104 can comprise a management engine 113 containing control logic for performing the processes of cloud management and a cloud management store 114. The cloud management system 104 can be configured to build, manage, and communicate with instantiated virtual machines 116 via one or more networks 106, such as the Internet or other public or private networks. The virtual machines 116 can be or include, for instance, a set of virtual servers that can support on-line services or sites, such as Web storefronts or music download or other media delivery. In embodiments as shown, the building of the instantiated virtual machines 116 can be initiated based on an instantiation request from a user, including the specification for software, computing, or other resources.

According to various embodiments, the identity management service 112 can be configured to communicate with the virtual machines 116 via network 106 in order to provide identity management to the virtual machines 116. Likewise, the identity management service 112 can be configured to communicate with on-premise systems 118, located outside of cloud 102, via a secure network 124 in order to provide identity management to the on-premise systems 118.

According to various embodiments, the identity management service 112 is configured to provide identity management for the virtual machines 116 and/or on-premise systems 118. This identity management may involve management of the virtual machines 116 and/or on-premise systems 118 contact with and utilization of information associated with the virtual machines 116 and/or on-premise systems 118. For example, the information can include a user's identity for access (e.g. login access, security), a user's identity maintained and provided (e.g., directory services), a user's identity utilized by the system (e.g. tracking, billing), data, products and services provided, and devices and resources associated with the virtual machines 116 and/or on-premise systems 118.

For example, if the virtual machines 116 and/or on-premise systems 118 are configured to execute Web storefronts, the identity management service 112 can be linked to the virtual machines 116 and/or on-premise systems 118 to create, maintain, and manage records for user's access to the Web storefronts and records of inventory and content available on the Web storefronts. This can include, for example, records of users accessing the Web storefront (user's identity information, login information, billing and address information, purchase and access history). This can also include, for example, records of the inventory and content provide by the Web storefronts (lists of products and services available, prices for products and services, available inventory).

In embodiments, to provide the identity management, the identity management service 112 includes an identity engine 120 and an identity store 122. The identity engine 120 includes the necessary control logic for performing the processes of identity management. In particular, the identity engine 120 can be configured to link with and communicate with the virtual machines 116 and/or on-premise systems 118 in order to receive, to maintain, to store, and to provide the identity information maintained by the identity management service 112. To receive, store, maintain, and provide the identity information, the identity engine 120 can be configured to create and maintain identity records of the information in identity store 122. The records containing the identity information can be created, stored, and maintained in identity store 122 using any type of conventional protocols and formats such as Lightweight Directory Access Protocol (LDAP).

In embodiments, in order to create and maintain the identity records, the identity engine 120 can be configured to link and communicate with the virtual machines 116 and/or on-premise systems 118 using a unique identifier associated with the virtual machines 116 and/or on-premise systems 118. The unique identifier can be Internet Protocol IP) address, a file, certificate, cookie, or other identification object encoding a unique identifier identifying the particular the virtual machines 116 or on-premise systems 118. As such, the identity engine 120 can create and maintain the identity information records associated with the unique identifier for the particular virtual machines 116 and/or on-premise systems 118 with which the identity information is related. The virtual machines 116 and/or on-premise systems 118 can send or request identity information from the identity management service 112 by referencing the identity information desired and the unique identifier.

In embodiments, to maintain security and privacy, the identity management service 112 can be configured to communicate with on-premise systems 118 via a secure network 124. The secure network 118 can be any type of private or secure public network connected to the identity management service 112 and on-premise systems 118. Likewise, the secure network 124 can be a virtual private network created across a network, such as network 106, using encryption protocols.

In embodiments, the identity management service 112 can be configured to charge owners of the virtual machines 116 and/or on-premise systems 118 for providing the identity management. The charge can be based on a number of factors including number of entries in identity records, the size of identity records, the number of requests from the virtual machines 116 and/or on-premise systems 118, the number of the virtual machines 116 and/or on-premise systems 118 linked to the identity management service 112, a flat rate for identity management, duration of identity management, and combinations thereof.

To determine a charge, the identity management service 112 can maintain a list of rates based on the different factors and can maintain a record of the usage by a particular virtual machines 116 and/or on-premise system 118. The identity management service 112 can maintain the usage record associated with an identification of the owner or operator of the virtual machines 116 and/or on-premise system 118 along with the unique identifier. The cloud management system 104 can utilize the usage record and rates list to bill the owner for the identity management. For example, the identity engine 122 can retrieve the usage records and rates list from identity store 122 and calculate the charges. The identity management service 112 can initiate a payment process, via any electronic or physical payment process, for the extracted fees. For example, the management engine 128 can generate a bill to be transmitted or can initiate automatic payment if the owner has provided payment information. The identity management service 112 can perform the billing process on-demand or in a periodic manner.

Figure 4:
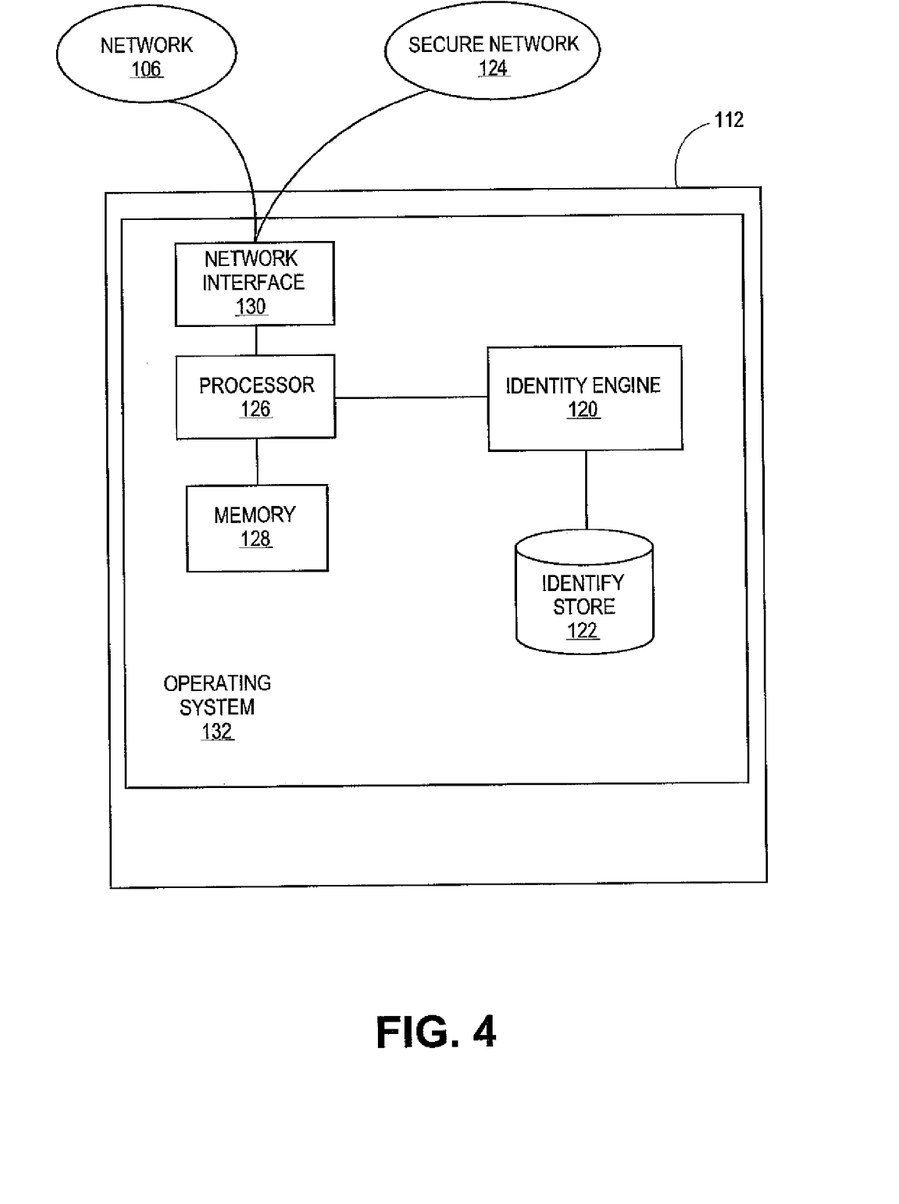
FIG. 4 illustrates an exemplary hardware configuration for a identity management service, according to various embodiments.

FIG. 4 illustrates an exemplary diagram of hardware and other resources that can be incorporated in an identity management service 112 configured to communicate with instantiated virtual machines 116 and/or on-premise systems 118 via one or more networks 106 and/or secure network 124, according to embodiments. In embodiments as shown, the identity management service 112 can comprise a processor 126 communicating with memory 128, such as electronic random access memory, operating under control of or in conjunction with operating system 132. Operating system 132 can be, for example, a distribution of the Linux™ operating system, the Unix™ operating system, or other open-source or proprietary operating system or platform. Processor 126 also communicates with the identity store 122, such as a database stored on a local hard drive. Processor 126 further communicates with network interface 130, such as an Ethernet or wireless data connection, which in turn communicates with one or more networks 106 and/or secure network 124, such as the Internet or other public or private networks. Processor 126 also communicates with the identity engine 120 and identity store 122 to execute control logic and perform identity management from the cloud 102.

Other configurations of the identity management service 112, associated network connections, and other hardware and software resources are possible. Additionally, because the identity management service 112 resides in the cloud 102, the identity management service 112 can be implemented in a virtual machine in the cloud 102.

Figure 5:
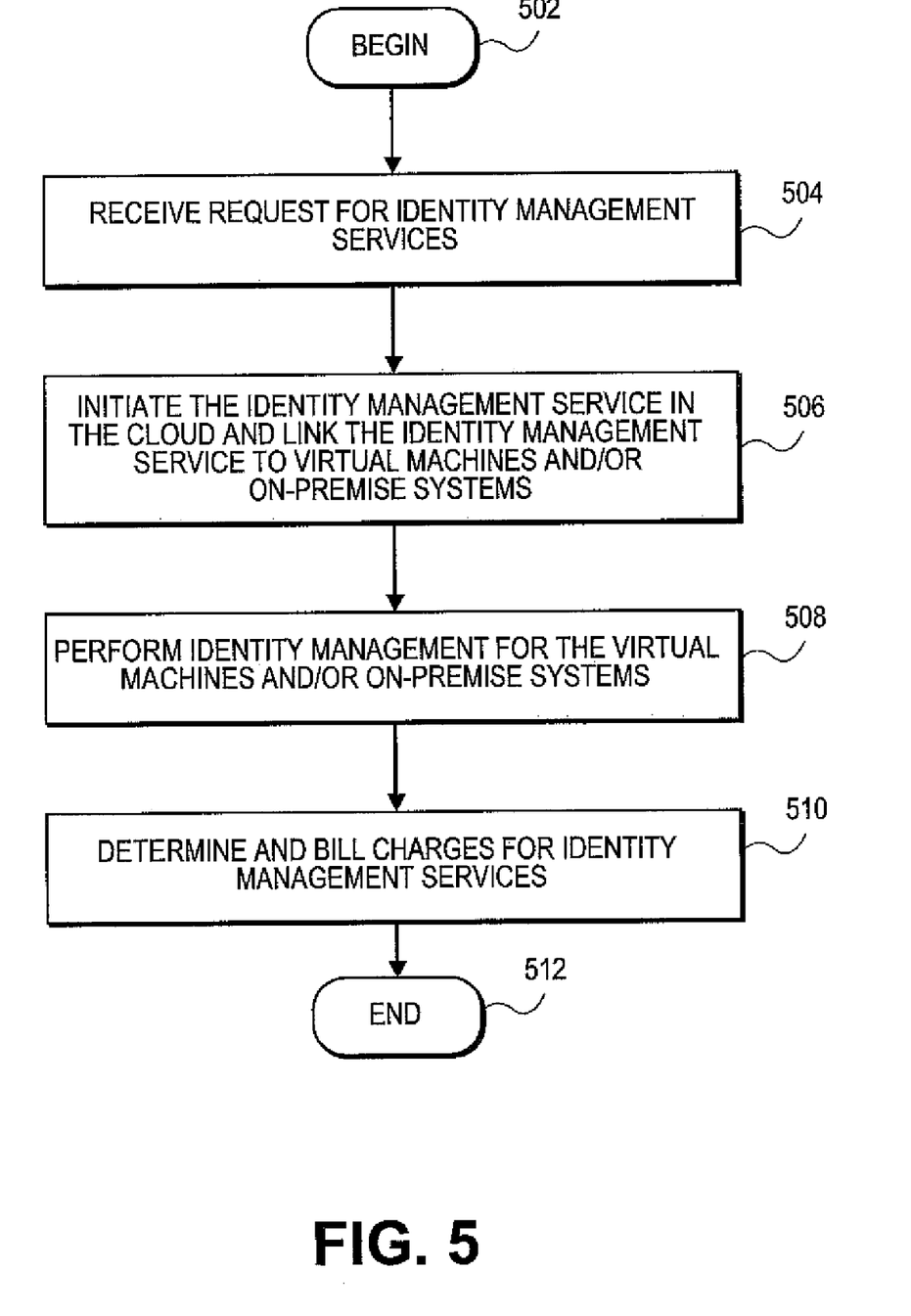
FIG. 5 illustrates a flowchart for overall identity management, according to various embodiments.

FIG. 5 illustrates a flow diagram of overall identity management in a cloud environment, according to embodiments of the present teachings. In 502, processing can begin. In 504, the identity management service 112 an receive a request for identity management. The request can be received from an owner or operator of systems such as the virtual machines 116 and/or the on-premise systems 118 or can be received from the systems themselves.

In 506, the identity management system 112 can initiate identity management and link the identity management to the virtual machines 116 and/or the on-premise systems 118. For example, the identity management system 112 can obtain the unique identifier for the virtual machines 116 and/or the on-premise systems 118 and identifying information for the owner of the virtual machines 116 and/or the on-premise systems 118. The unique identifier and identifying information can be received in the request or obtained from other sources such as the cloud management system 104. The identity records can then be created associated the unique identifier and identifying information.

After initiation, in 508, the identity management system 112 can begin performing identity management. For example, the identity management system 112 can receive, store, maintain, and provide identity information for the virtual machines 116 and/or the on-premise systems 118. To receive, store, maintain, and provide the identity information, the identity management system 112 can be configured to create and maintain identity records of the information. The records containing the identity information can be created, stored, and maintained using any type of conventional protocols and formats such as Lightweight Directory Access Protocol (LDAP).

In 510, the identity management system 112 can determine charges for the identity management. To determine charges, the identity management service 112 can maintain a list of rates based the different factors and can maintain a record of the usage by a particular virtual machines 116 and/or on-premise system 118. The identity management service 112 can perform the billing process on-demand or in a periodic manner.

Then, in 512, if the identity management terminates, the process can end, but the process can return to any point and repeat.

In the foregoing and other embodiments, the user making an instantiation request or otherwise accessing the cloud network can be a person, customer, subscriber, corporation, organization, or other entity. In embodiments, the user can be or include another virtual machine, application or process. In further embodiments, multiple users or entities can share the use of a set of virtual machines or other resources.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of managing identity in a cloud computing environment, comprising:
   receiving a request to instantiate identity management services in the cloud computing environment from an operator of a set of managed machines;
   instantiating the identity management services in the cloud computing environment for the set of managed machines;
   receiving identity information from at least one system linked to the identity management services; and
   storing the identity information from the at least one system in the identity management services in the cloud computing environment.

2. The method of claim 1, wherein the at least one system comprises at least one virtual machine instantiated in the cloud computing environment.

3. The method of claim 1, wherein the at least one system comprises at least one system running external to the cloud computing environment.

4. The method of claim 1, further comprising:
   receiving a request to provide the identity information stored in the identity management services, the request including an identifier of at least one managed system;
   retrieving the requested identity information based on the identifier; and
   providing the requested identity information.

5. The method of claim 1, further comprising:
   determining a charge associated with the identity management service; and
   providing the determined charge to the at least one system or an owner of the at least one system.

6. The method of claim 5, wherein the determined charge is based on at least one of an amount of identity information received, a number of the at least one system, a duration of the identity management service, or a flat charge associated with the identity management service.

7. The method of claim 1, wherein the identity information comprises at least one of user identity information or data associated with the at least one system.

8. The method of claim 1, wherein the cloud computing environment comprises a set of resource servers configured to deliver resources to instantiate at least one virtual machine.

9. A system for managing identity and located in a cloud computing environment, comprising:
   a network interface to at least one system; and
   a processor configured to execute an identity management module, communicating with the network interface, the identity management module being configured to—
   receive a request to instantiate identity management services in the cloud computing environment from an operator of a set of managed machines;

instantiate the identity management services in the cloud computing environment for the set of managed machines;

receive identity information from at least one system linked to the identity management services; and store the identity information from the at least one system in the identity management services.

10. The system of claim 9, wherein the at least one system comprises at least one virtual machine instantiated in the cloud computing environment.

11. The system of claim 9, wherein the at least one system comprises at least one of a system running external to the cloud computing environment.

12. The system of claim 9, wherein the identity management module is further configured to— receive a request to provide the identity information stored in the identity management services, the request including an identifier of at least one system;

retrieve the requested identity information based on the identifier; and provide the requested identity information.

13. The system of claim 9, wherein the identity management module is further configured to— determine a charge associated with the identity management service; and provide the determined charge to the at least one system or an owner of the at least one system.

14. The system of claim 13, wherein the determined charge is based on at least one of an amount of identity information received, a number of the at least one system, a duration of the identity management service, or a flat charge associated with the identity management service.

15. The system of claim 9, wherein the identity information comprises at least one of user identity information or data associated with the at least one system.

16. The system of claim 10, wherein the cloud computing environment comprises a set of resource servers configured to deliver resources to instantiate the at least one virtual machine.

17. A computer-readable storage medium, the computer-readable storage medium storing a module for managing identity and located in a cloud computing environment, the module configured to cause a computer to perform the method comprising:

receiving a request to identity management services in the cloud computing environment from an operator of a set of managed machines;

instantiate the identity management services in the cloud computing environment for the set of managed machines;

receiving identity information from at least one system linked to the identity management services; and storing the identity information from the at least one system in the identity management services.

18. The computer-readable storage medium of claim 17, wherein the at least one system comprises at least one virtual machine instantiated in the cloud computing environment.

19. The computer-readable storage medium of claim 17, wherein the at least one system comprises at least one of a system running external to the cloud computing environment.

20. The computer-readable storage medium of claim 17, the method further comprising:

receiving a request to provide the identity information stored in the identity management services, the request including an identifier of at least one system;

retrieving the requested identity information based on the identifier; and providing the requested identity information.

21. The computer-readable storage medium of claim 17, the method further comprising:

determining a charge associated with the identity management service; and providing the determined charge to the at least one system.

22. The computer-readable storage medium of claim 21, wherein the determined charge is based on at least one of an amount of identity information received, a number of the at least one system, a duration of the identity management service, or a flat charge associated with the identity management service.

23. The computer-readable storage medium of claim 17, wherein the identity information comprises at least one of user identity information or data associated with the at least one system.

24. The computer-readable storage medium of claim 17, wherein the cloud computing environment comprises a set of resource servers configured to deliver resources to instantiate the at least one virtual machine.

* * * * *